(12) United States Patent
Dean et al.

(10) Patent No.: US 6,477,654 B1
(45) Date of Patent: Nov. 5, 2002

(54) MANAGING VT FOR REDUCED POWER USING POWER SETTING COMMANDS IN THE INSTRUCTION STREAM

(75) Inventors: Alvar Antonio Dean, Essex Junction, VT (US); Patrick Edward Perry, Shelburne, VT (US); Sebastian Theodore Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/287,159

(22) Filed: Apr. 6, 1999

(51) Int. Cl.[7] .................................................. G06F 1/32
(52) U.S. Cl. ........................................ 713/300; 713/322
(58) Field of Search ........................ 713/300, 322–324, 713/600, 601, 372

(56) References Cited

U.S. PATENT DOCUMENTS

| | | | |
|---|---|---|---|
| 5,142,684 A | 8/1992 | Perry et al. ................. 395/750 |
| 5,167,024 A | 11/1992 | Smith et al. ................ 395/375 |
| 5,388,265 A | * 2/1995 | Volk ........................... 713/322 |
| 5,452,401 A | 9/1995 | Lin ............................. 395/750 |
| 5,461,266 A | 10/1995 | Koreeda et al. ............. 307/125 |
| 5,485,623 A | 1/1996 | Kurokawa et al. ........ 395/182.2 |
| 5,589,783 A | 12/1996 | McClure ...................... 326/71 |
| 5,610,533 A | 3/1997 | Arimoto et al. .............. 326/33 |
| 5,627,412 A | 5/1997 | Beard .......................... 307/82 |
| 5,655,124 A | 8/1997 | Lin ....................... 395/750.04 |
| 5,675,808 A | 10/1997 | Gulick et al. ................ 395/750 |
| 5,692,201 A | 11/1997 | Yato ............................ 395/750 |
| 5,692,204 A | 11/1997 | Rawson et al. ............. 395/750 |
| 5,704,053 A | * 12/1997 | Santhanam .................. 712/207 |
| 5,719,800 A | * 2/1998 | Mittal et al. ................. 713/321 |
| 5,754,869 A | 5/1998 | Holzhammer et al. . 395/750.01 |
| 5,790,875 A | 8/1998 | Andersin et al. ...... 395/750.03 |
| 5,815,724 A | * 9/1998 | Mates ......................... 713/322 |
| 5,819,097 A | * 10/1998 | Brooks et al. .............. 395/705 |
| 5,825,674 A | * 10/1998 | Jackson ...................... 713/321 |
| 5,864,702 A | * 1/1999 | Walsh et al. ................ 713/300 |
| 5,881,290 A | * 3/1999 | Ansari et al. ............... 395/705 |
| 5,996,083 A | * 11/1999 | Gupta et al. ................ 713/322 |
| 6,011,383 A | * 1/2000 | Dean et al. ................. 323/234 |
| 6,049,882 A | * 4/2000 | Paver ......................... 713/322 |
| 6,141,764 A | * 10/2000 | Ezell .......................... 713/340 |
| 6,219,796 B1 | * 4/2001 | Bartley ....................... 713/320 |

FOREIGN PATENT DOCUMENTS

WO    WO-9737307 A1 * 10/1997    ................. 713/322

* cited by examiner

*Primary Examiner*—Xuan M. Thai
(74) *Attorney, Agent, or Firm*—Connolly Bove Lodge & Hutz, LLP; M. Chadurjian (57) ABSTRACT

An integrated circuit includes a plurality of functional units which are capable of operating at more than one power/performance level and a power control unit. The power control unit controls the power/performance consumption of the different functional units to optimize operation of the integrated circuit. Special power control instructions are added to user applications in order to control via the power control unit, the power consumption of the different functional units.

32 Claims, 5 Drawing Sheets

| | |
|---|---|
| A | INSTRUCTION |
| | POWER COMMAND UP 3 |
| B | INSTRUCTION |
| C | INSTRUCTION |
| D | INSTRUCTION |
| | POWER COMMAND DOWN 1 |

FIG.5

MANAGING VT FOR REDUCED POWER USING POWER SETTING COMMANDS IN THE INSTRUCTION STREAM

RELATED APPLICATION

This application is related to co-pending application Ser. No. 09/287,173 filed on even date herewith entitled "Managing $V_t$ for Reduced Power Using a Status Table" filed in the names of Claude Bertin, Alvar Dean, Ken Goodnow, Scott Gould, Pat Perry, Dave Pricer, Dan Reed, William Tonti and Sebastian Ventrone.

TECHNICAL FIELD

The invention relates to integrated circuits and more particularly intelligent power management of the integrated circuit.

BACKGROUND OF INVENTION

The application and acceptance of portable electronic devices has emphasized the importance of controlling and or optimizing power consumption. Actually controlling power consumption may be satisfied by adjusting the body voltage (i.e. the voltage magnitude between body and source) applied to transistors in an integrated circuit (IC). By increasing the body to source voltage, transistors achieve a higher threshold voltage, consume less power but, on the other hand, provide lower performance and vice versa. It is also known that the IC can be broken down into several partitions or sectors and the body voltage controlled on a partition by partition basis, see in this regard copending application entitled "Low Powering Apparatus for Automatic Reduction of Power in Active and Standby Modes" by Dean et al filed Jul. 21, 1998, Ser. No. 09/120,211, ultimately issued as U.S. Pat. No. 6,011,383, and "Device and Method to Reduce Power Consumption in Integrated Semiconductor Devices Using a Lower Power Groggy Mode", Bertin et al, filed on Sep. 24, 1998, Ser. No. 09/159,861, ultimately issued as U.S. Pat. No. 6,097,243, and "ASIC Low Power Activity Detector to Change Threshold Voltage", Dean et al, U.S. Ser. No. 09/159,898, filed on Sep. 24, 1998, and ultimately issued as U.S. Pat. No. 6,097,241. The disclosures of these applications are incorporated herein by reference.

Notwithstanding the foregoing, the art lacks a technology to allow optimizing power management in light of the actual repertoire of instructions applied to a partitioned integrated circuit.

SUMMARY OF INVENTION

The present invention provides an integrated circuit in which power is managed intelligently relative to the demands placed on the integrated circuit. In order to implement the foregoing the integrated circuit is designed with discrete functional units, each dedicated to a particular function or functions where each of the functional units has an independently controllable body voltage or threshold voltage ($V_t$). Consequently, each of the functional units can be operated at one of plural power levels depending on the body or threshold voltage applied thereto and independent of other functional units. Since the functional units have discrete functions, it is possible to correlate specific software instructions with one or a set of functional units. Execution of the instruction at a high rate will require the correlated functional units to be in a high power state, other functional units, i.e. those not correlated with the instruction, need not be in the high power state.

For example, assume the IC had functional units dedicated to floating point arithmetic functions and a modem operation and the application program or program segment being executed involved a remote file transfer but no floating point operations. One could optimize the performance, that is reduce power consumption but maximize speed of the IC, by reducing the power consumed by the floating point arithmetic functional unit(s) to a minimum and raising the power consumption of the modem-related unit(s). The raising of the power level in the modem-related units is justified by the increase in performance while the power savings on the floating point arithmetic functional unit(s) is obtained at no cost since the absence of floating point arithmetic operations means the performance of that functional unit or units is of no consequence to the execution of the application or program segment.

In general it is an object of the invention to control the power consumption of various functional units so as to present functional units in a high power state when instructions requiring their operation are to be executed and concomitantly to minimize power wasted on functional units which are not involved in current instructions. This may be effected by powering up a functional unit which is called on and powering down that unit thereafter.

In connection with one embodiment of the invention, an application, i.e. a series of instructions to be executed, is recompiled or modified so as to add to the application one or more power control instructions. The power control instructions each may be addressed so as to indicate to which of the functional unit or units that power control instruction applies. The intent is that the power control instructions, after being added to the instruction stream, are stored along with the preexisting instructions so that when the program containing the instructions is executed, the power control instructions will optimize the power status of the plural functional units. More particularly, the functional units which are required for execution of a particular instruction should be in an appropriate power state, that is a high power state at the time the instruction will be executed. Other functional units, which are not required for execution of the particular instruction, need not be in a high power state. In order to add the appropriate power control instructions, an analysis function analyzes the instructions contained in the application to identify correlated functional units. The analysis unit will assume that on initialization all functional units will be in their lowest power state.

The analysis function identifies the population of functional units and related parameters, such as the time required to transition the unit from a low to a higher power state. Thereafter the analysis function correlates the instructions in the user application or program with the various functional units. With the result of this correlation the analysis function can determine which functional units are required to be in a higher power state for each of the instructions in the application. Then the analysis function selects a unit and, for each unit performs the following.

First, a determination is made regarding whether it is possible to determine which code segment(s) in the application exclusively use the unit, where a code segment is defined to have one and only entrance and exit. If such code segment(s) can be identified, then we can be assured that the instruction sequence which eventuates in use of the unit is known. This is in contrast to more complex instruction sequencing as in the case of branch operations. Where exclusive use of the unit can be determined the analysis function can insert a power up and power down instruction, addressed to the unit being processed in a location of the instruction sequence to bracket the segment. That is the power up instruction is placed at the entrance to the segment and a power down instruction is placed at the termination of the segment. If on the other hand it is not possible to determine one or more code segment which exclusively uses the unit then it is necessary to determine if the unit is ever used in the application. If the unit is never used then it can remain in a low power state and it is placed on an always off list. If the unit is ever used, then it is placed on an always on list.

After each unit is processed in this way, there are two terminal functions that are necessary. In a first of the terminal functions, a power down power control instruction is placed in the beginning of the application and addressed to each unit on the always off list and a power up power control instruction is placed in the beginning of the application and addressed to each always on unit. In the second of the terminal instructions a power down power control instruction is placed at the end of the application and addressed to each unit in the IC.

By appropriately inserting the power control instructions in the ordered sequence of instructions of the application as described, a modified ordered list or sequence of instructions is produced by the analysis function. This modified ordered list is then stored so that the integrated circuit can later execute the instructions of the modified ordered list when they are extracted from storage.

Accordingly, the invention provides a method of operating a programmable integrated circuit having plural functional units each operable at plural power levels, the integrated circuit including a functional unit power control unit responsive to power control instructions for altering the power status of selected one or more of said functional units, said method comprising:

storing plural instructions, said instructions including power control instructions, at least one of the stored power control instructions including data identifying a specific one of the functional units, extracting said stored instructions in a sequence, examining each extracted instruction to determine if it is a power control instruction, and changing the power status of at least the specific one of the functional units in response to the power control instruction.

The invention also provides an integrated circuit designed to use functional unit power control comprising:

plural functional units each operable at plural power levels, different ones of the power levels corresponding to different execution speeds of the functional units, a decode unit for receiving and decoding an addressed functional unit power control instruction, and means for changing a power level for a functional unit in response to said power control instruction.

In respect of another aspect, the invention provides, in an integrated circuit having plural functional units, each functional unit operable at plural power levels, the integrated circuit including a functional unit power control responsive to power control instructions for altering the power status of one or more of said functional units, a method of modifying the sequence of instructions to add power control instructions for controlling the power status of the functional units, the method comprising:

selecting an unprocessed unit, identifying a program segment which employs said unprocessed unit to the exclusion of other program segments, and inserting at least one power control instruction addressed to the unit for the determined program segment.

Still other objects and advantages of the present invention will become readily apparent by those skilled in the art from the following detailed description, which describes only the preferred embodiments of the invention, by way of illustration of the best mode contemplated of carrying out the invention. The invention is capable of other and different embodiments, and its several details are capable of modifications in various respects, without departing from the invention. Accordingly, the description is to be regarded as illustrative in nature and not as restrictive.

BRIEF DESCRIPTION OF THE DRAWINGS

The present invention will now be described in connection with the attached drawings in which like reference characters identify identical apparatus and in which.

BEST AND VARIOUS MODES FOR CARRYING OUT INVENTION

Figure 1:
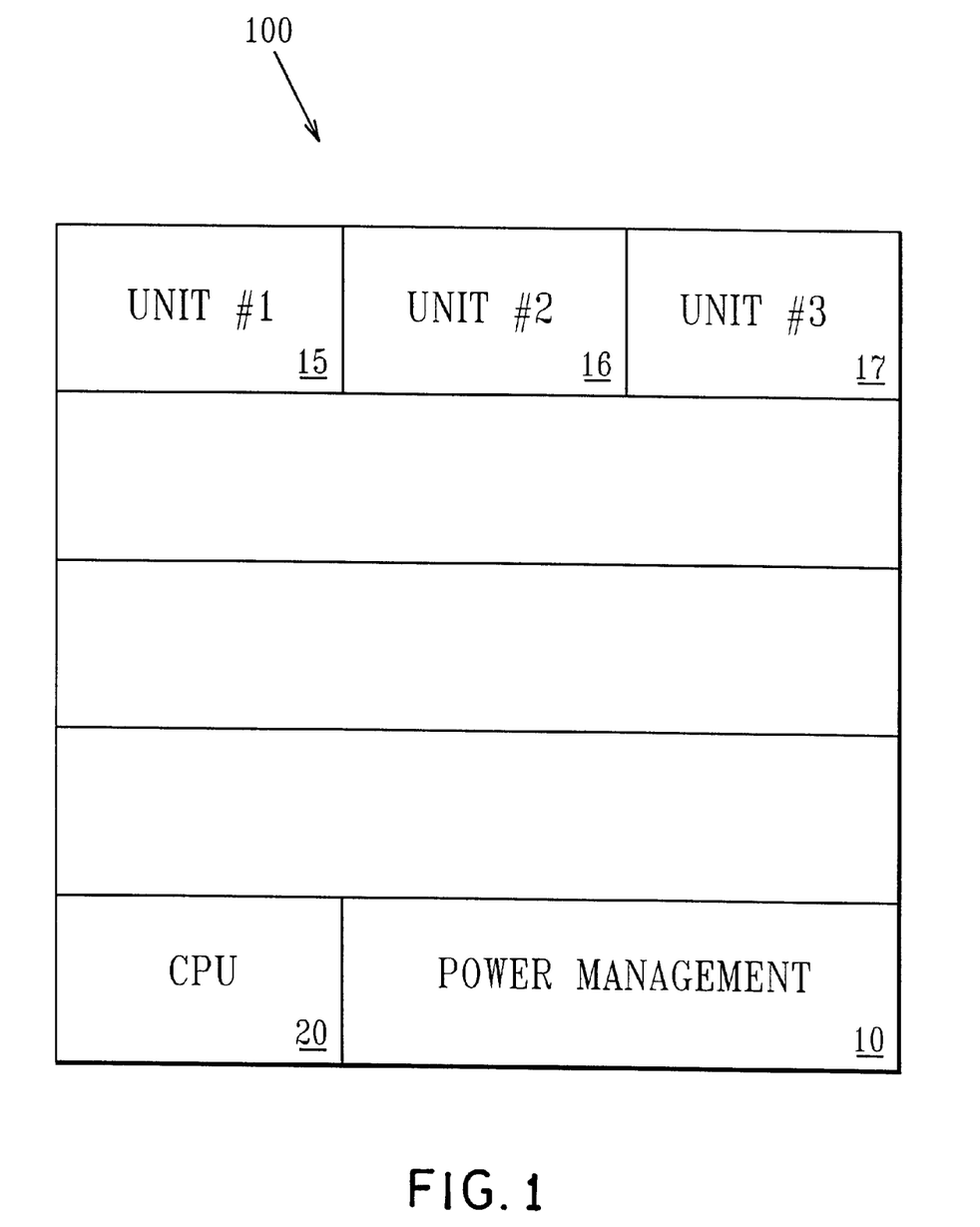
FIG. 1 is a block diagram of a chip in accordance with the present invention.

FIG. 1 is an illustration of a typical integrated circuit chip 100 which incorporates the present invention. The chip includes a plurality of functional units 1–n such as units 15, 16 and 17. Units 1–n are representative of a plurality of functional units which are included on the integrated circuit 100. Typically, the functional units will perform different functions and are capable of operating at different threshold voltages ($V_t$) where a higher threshold voltage represents a lower power consumption but at a slower speed of operation and a lower threshold voltage represents a higher power consumption but at a higher operating speed. As will be described, through the use of the method and apparatus of the invention, the power consumption of the different functional units may be controlled so as to optimize the operation of the chip as a whole in light of the specific instructions which are presented for execution. Optimized chip operation as a whole is realized by running at higher power level only those units which take part in execution of an instruction, and only for that period when those units are actually operating. Units which do not take part in execution are operated at minimum power levels for the period of time the units are not involved in the execution of an instruction. It is a thesis of the present invention that some functional units of the integrated circuit are not used in the execution of some instructions and hence minimizing the power level of the unused functional units will not affect performance for such an instruction. Consequently, optimized chip power/performance for that particular instruction results in running those particular functional units at a lower or lowest available power level.

Concomitantly, the functional units which are exercised in order to execute the particular instruction will be run at higher power level, or the highest power level, to achieve maximum performance.

FIG. 1 also shows that the integrated circuit chip includes a CPU 20 and a power control unit 10. The power control unit 10 sets the power levels for the different functional units, such as units 1–n, and responds to power commands communicated thereto.

Figure 4:
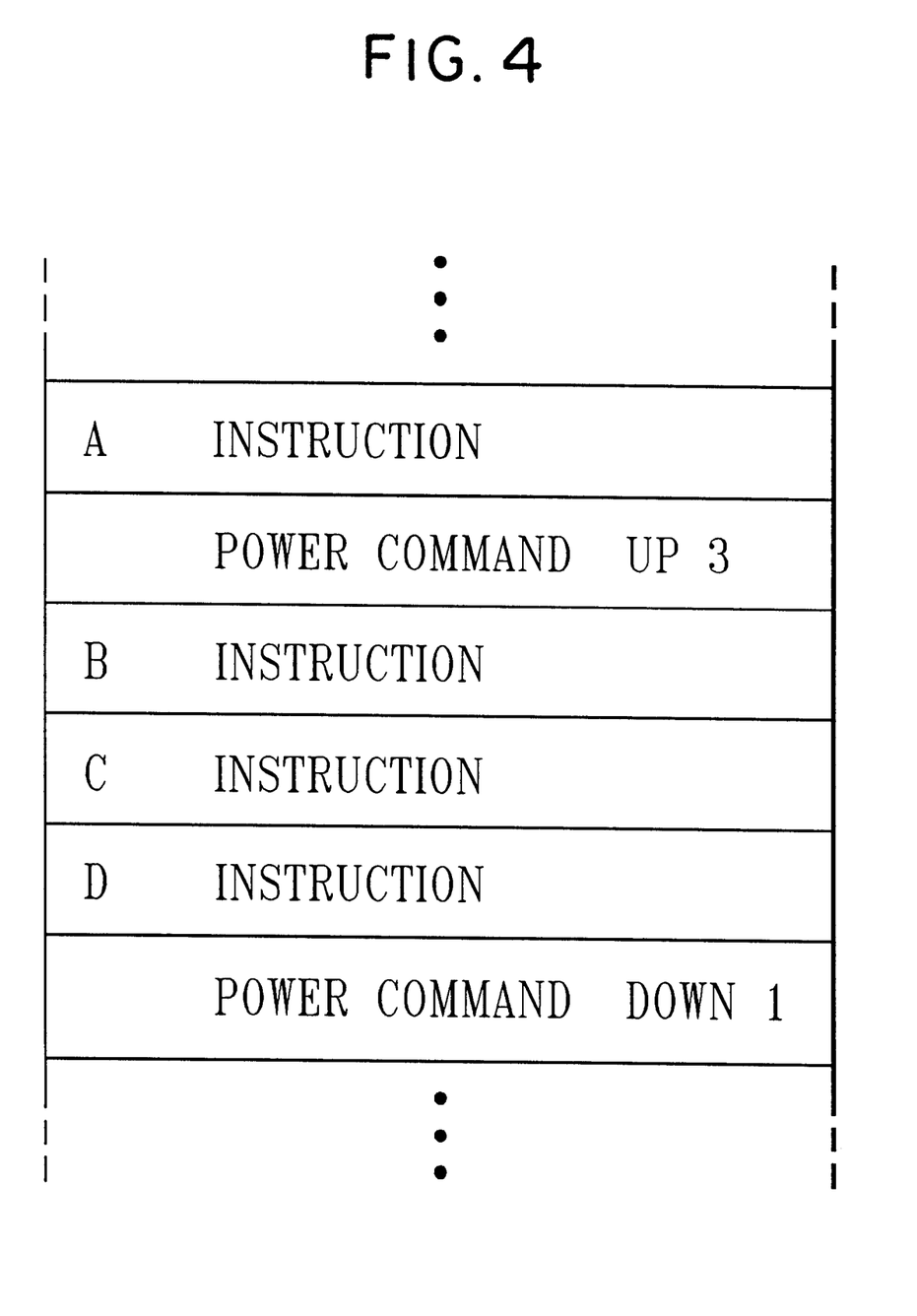
FIG. 4 is shows a representative program segment with added power control instructions.

FIG. 4 is a portion of a typical instruction sequence which is used with the invention. As shown in FIG. 4, the portion of the instruction sequence which is illustrated includes instructions A–D which are not otherwise identified. Instructions A–D may be instructions which are executed by the different functional units. However, in addition to these particular instructions, FIG. 4 shows two additional instructions, one denoted "power command up 3" and the other denoted "power command down 1". The first noted power command is an instruction to increase the power consumption of unit 3 (17) from a nominal or lower level to a high performance level. In a similar fashion, the other non-generic instruction shown in FIG. 4 is "power command down 1". This denotes a power command to decrease the power consumption of unit 1 (15) from a high performance level to a low or nominal level. In each case, that power command is executed, as will be described, by changing $V_t$ for the addressed functional unit. The commands shown in FIG. 4 are representative and in practice other power commands will be interspersed in the application.

Typically, instructions are stored in non-volatile memory in a sequence. When called on for use, the instructions are extracted from the non-volatile memory and provided to the CPU where they are decoded and executed. It is contemplated that the chip of the invention operates in a similar fashion, the only difference being that interspersed in conventional instructions will be one or more addressed power command instructions as is shown for example in FIG. 4.

Figure 2:
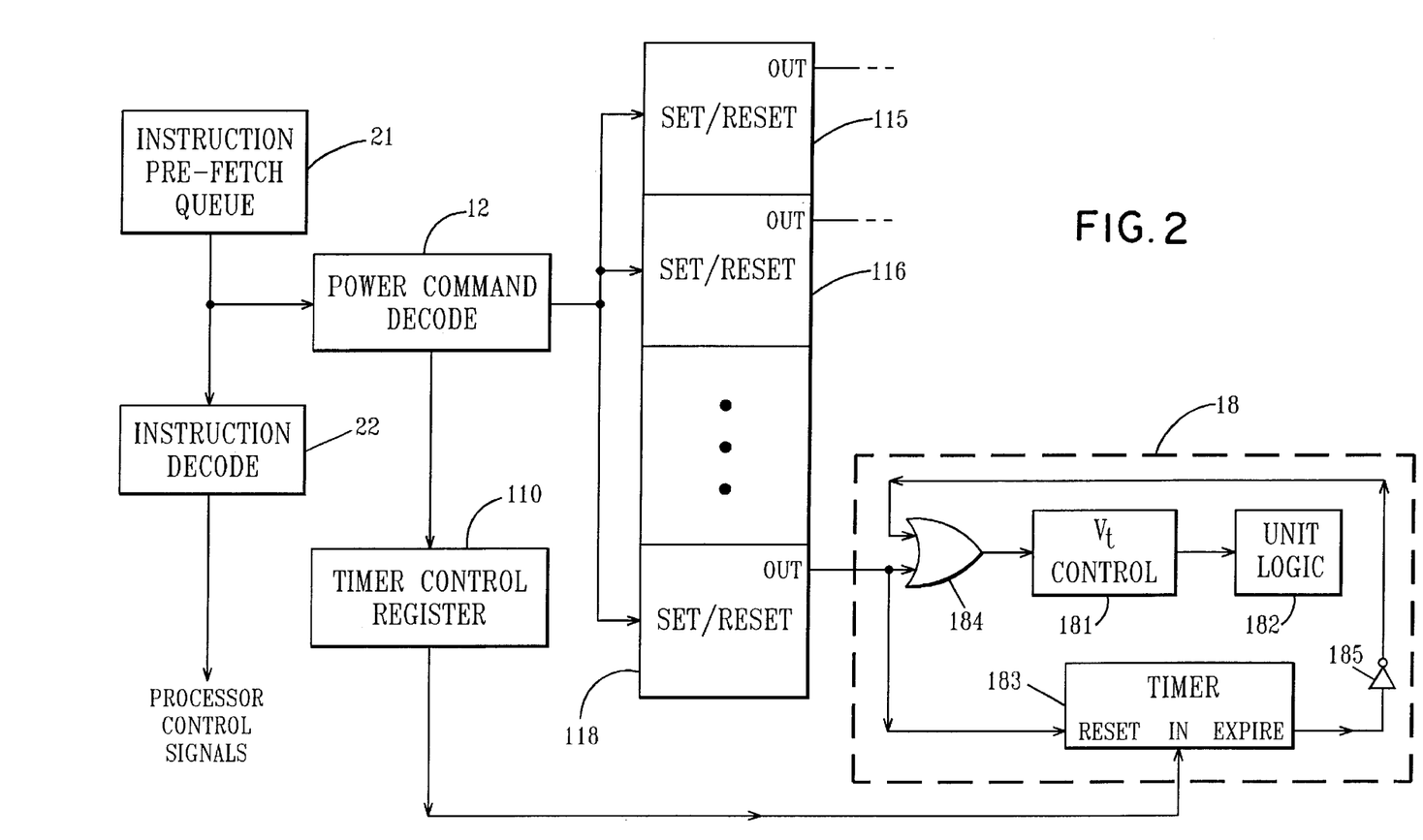
FIG. 2 is a more detailed block diagram.

FIG. 2 is a more detailed block diagram of a portion of the subject matter shown in FIG. 1. FIG. 2 shows that the power control unit 10, a portion of the CPU 20, includes a $V_t$ command decoder 12, timer control register 110, and a plurality of register stages including stages 115, 116 and 118. FIG. 2 also shows a portion of the instruction stream of the CPU 20 including a prefetch queue 21 and an instruction decode unit 22. In the conventional portion of the CPU 20, the instruction stream flows from the prefetch queue 21 to the instruction decode unit 22; other conventional portions of the CPU 20 are not illustrated. However, the instruction stream is also connected to the power control unit 10 and particularly provides an input to the command decode 12. The command decode 12 responds only to the "power command" such as those illustrated in FIG. 4. In particular, the address portion of the power command is used by the decode unit 12 to address the corresponding register. Thus, the output of the command decode unit 12 is coupled to the input terminal of register stages 115, 116 and 118. Those skilled in the art will understand that these are representative of a plurality of stages, one for each different functional unit in the chip. Consequently, when the power command for a particular unit is detected, the output of the command decode unit 12 causes the corresponding register stage to be set or reset via signal to its set/reset input terminal. The power on command, when decoded results in setting the addressed register stage and the power off command, when decoded results in resetting the addressed register stage.

FIG. 2 also illustrates the breakdown of a typical unit, such as unit 18. As shown in FIG. 2, the unit 18 comprises three major components, the first component 182 is the core functional unit per se which is arranged to perform the function of the functional unit. The other two elements, the timer 183 and the $V_t$ control 181 are arranged to control the power consumption for the functional unit as will now be described.

The output terminal of a register stage, such as 118, is connected to one input of an OR gate 184. The timer 183 has two inputs, IN and RESET, and an output, EXPIRE. Asserting IN initiates timing and after the timing period expires, EXPIRE is asserted. The EXPIRE output is connected via an inverter 185 and forms the other input of the OR gate 184. The input is used to set or control the period of the timer. This is implemented by use of a special power command instruction.

Figure 5:
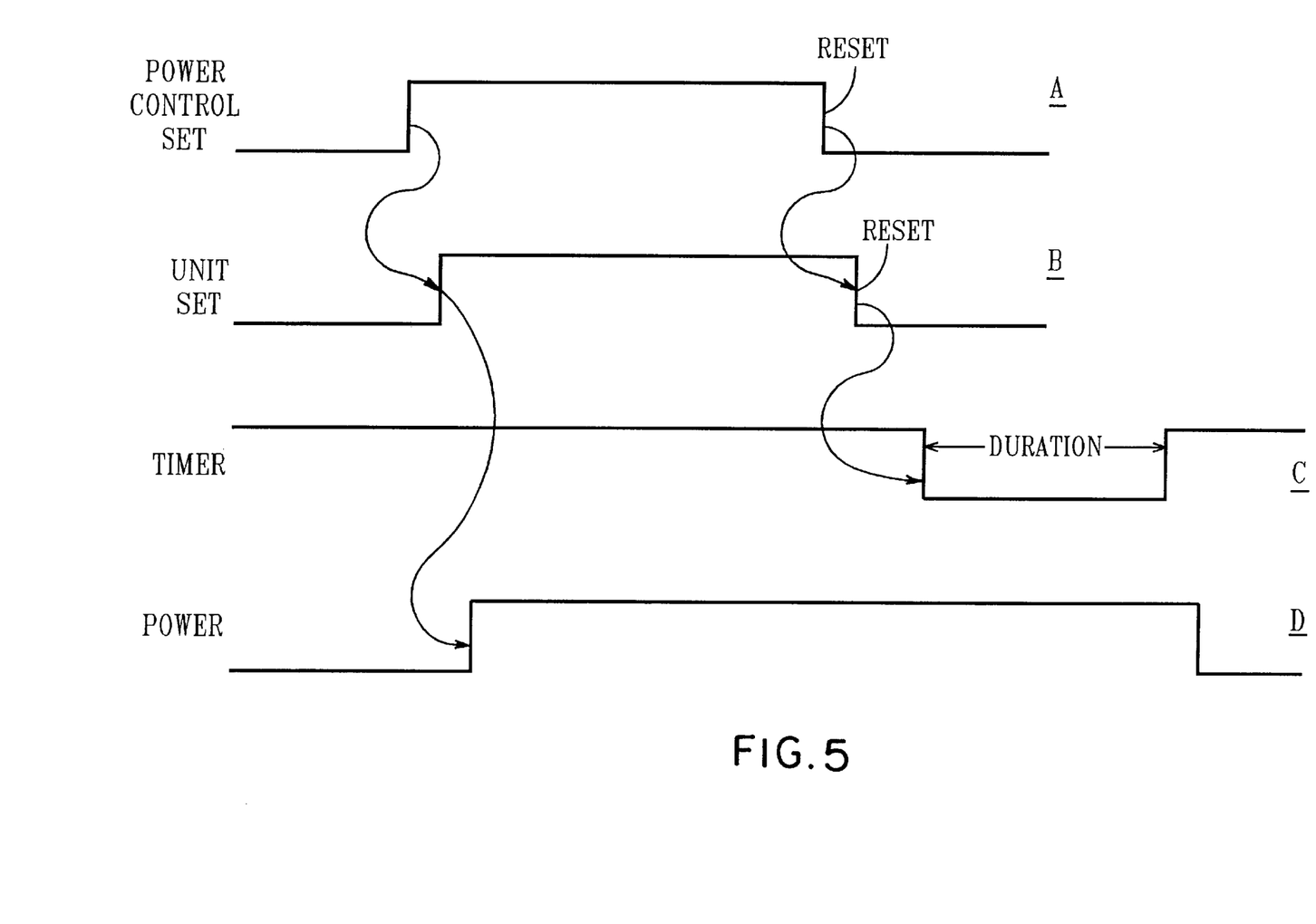
FIG. 5 is a timing diagram having lines A–D which is useful in explaining the operation of the apparatus of FIG. 2.

FIG. 5 is a timing diagram showing how the register stage and the functional unit controls interact. Line A of FIG. 5 is the input to the related register such as register 118. Line B is the output of that stage. Line D shows the status of the input to control 181 and, perhaps with some delay the power status and performance of the core logic of the unit. In other words, when POWER (line D) is high the unit is in a higher power state as compared to the state of the unit when POWER is low. As is also seen in FIG. 5, the timer (line C) 183 is initiated when the stage is reset (see lines B and C). Only when timer 183 times out is the power status of the unit changed to the low power state. The period of the timer is used to provide a few more cycles of the higher power status for the unit after execution of the power down command to allow the rest of the instructions that use the unit flush through the processor instruction pipeline.

When the output terminal of a register is asserted, the output, when received by the corresponding unit, has two effects. One effect is at the $V_t$ control, such as the control 181. This has the effect of decreasing $V_t$ to the core unit 182 and consequently (and perhaps after some delay) reducing the threshold, increasing the power consumption and performance of the core unit 182. In addition, when the register output is reset (goes low), this resets the timer 183 to initiate timing out its time period. The unit will remain in the higher power state until a power down command, addressed to the unit is decoded, which resets the Power Control Set line A. The decoded command is detected, resulting in addressing the associated unit to initiate the timer 183. The reset nature of the expire output during timing by the timer has the effect at the OR gate 184 of masking the fact that the output of state 118 also becomes reset. Thus (line B) when the output of the stage 118 goes low, the unit 18 does not respond. It is not until the timer 183 expires and raises its expire output that the control 181 detects the reset nature of its input and reduces the power of the unit 182.

Figure 3:
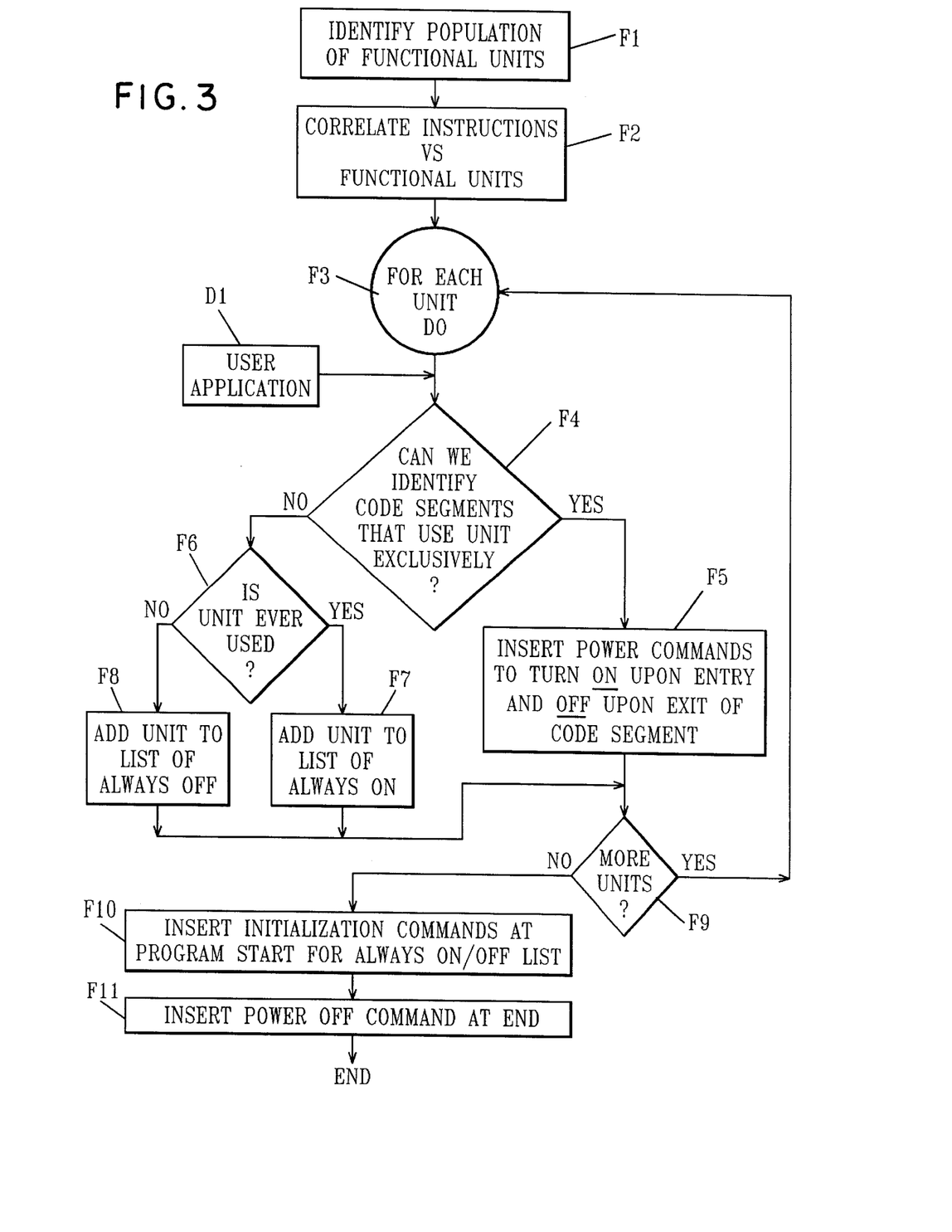
FIG. 3 is a flow diagram illustrating the steps used to modify an application to add appropriate power control instructions.

FIG. 3 illustrates the steps implemented in the analysis function in order to recompile or modify a user application to include appropriate power up and power down commands or instructions. As shown in FIG. 3, the first step F1 is to identify the population of functional units on the chip. The next step, F2, is to correlate the instruction repertoire with the functional units, i.e. which functional units are exercised on which instructions? Clearly, some functional units may be exercised by more than one instruction and typically one instruction will exercise multiple functional units. With the information provided in steps F1 and F2, and with the user application available, D1, the analysis function then performs a series of operations for each of the functional units in the chip. The first of those operations is F1, a determination is made whether or not it is possible to identify code segment (either one or more) which exclusively use the unit where the definition of a code segment is that it has a single entrance and a single exit point with no external branches or jumps between the entrance and exit points. If code segments can be identified which exclusively use the unit, then step F5 is performed to insert power commands to turn the unit on at the entry point and a power command to turn the unit off at the exit point. On the other hand, if it is not possible to identify a code segment or segments which exclusively use the unit, because of branching operations or other complex software functions, then step F6 is performed to determine if that unit is ever used in the application. If the unit is never used in the application, then step F8 is performed to add the unit to a list of units which are "always off". On the other hand, if the unit is used in the application, then step F7 is performed to add the unit to a list of units which are "always on". At the completion of steps F5, F7 or F8, step F9 is performed to determine if there are additional units in the chip which have not yet been processed. If there are, processing loops back to F3, another unit is selected, and the previously described steps are repeated.

On the other hand, if all units have been processed, then step F10 is performed which inserts initialization commands at the program start for always on and always off units. In particular, the initialization command for always off units would be power off. The initialization command at the program start for always on units would be power on. Finally, step F11 is performed to insert a power off command, addressed to each unit in the chip, at the conclusion of the program.

Accordingly, it should be apparent that the user application is recompiled or modified so that the instruction sequence, at the conclusion of the operation, includes appropriate address power on and power off commands. The commands inserted at step F5 each are addressed to the unit being processed. The commands inserted by reason of steps F10 and F11 are also addressed to specific units.

The specification describes only the preferred embodiments of the invention but it is to be understood that the invention is capable of use in various other combinations and environments and further that the invention is capable of changes or modifications. The embodiments described here are simply intended to explain the best modes known of practicing the invention and to enable others skilled in the art to utilize the invention in such, or other, embodiments and with the various modifications required by the particular applications or uses of the invention. Accordingly, this description is not intended to limit the invention to the form disclosed herein, rather the scope of the invention is to be determined by the claims attached hereto.

What is claimed is:

1. A method of operating a programmable integrated circuit having plural functional units each operable at plural operable power levels, the integrated circuit including a functional unit power control unit including a Vt command decoder for receiving an instruction stream from an instruction prefetch queue and responsive to pre-inserted power control instructions generated by a compiler or a post-processing program for altering the power status of selected one or more of said functional units, said method comprising:

storing plural instructions, said instructions including the pre-inserted power control instructions, at least one of the stored power control instructions including data identifying a specific one of the functional units, extracting said stored instructions in a sequence, examining each extracted instruction to determine if it is a power control instruction, and changing the power status of at least the specific one of the functional units in response to the power control instruction to one of the plural operable power levels.

2. The method of claim 1 wherein changing the power status comprises increasing the power consumption of the specific functional unit in response to a pre-inserted power up instruction.

3. The method of claim 2 wherein changing the power status comprises decreasing the power consumption of the specific functional unit in response to a pre-inserted power down instruction.

4. The method of claim 3 which further includes decreasing the power consumption of the specific functional unit only after a lapse of at least a predetermined time after responding to the pre-inserted power down instruction.

5. The method of claim 2, wherein said increasing the power consumption of the specific functional unit in response to a pre-inserted power up instruction includes reducing a body voltage of at least one transistor in said specific functional unit.

6. The method of claim 3, wherein said decreasing the power consumption of the specific functional unit in response to a pre-inserted power down instruction includes increasing a body voltage of at least one transistor in said specific functional unit.

7. The method of claim 1, wherein said changing the power status of at least the specific one of the functional units in response to the power control instruction includes changing a body voltage of a transistor in said one of the functional units.

8. The method of claim 1, wherein said changing the power status of at least the specific one of the functional units includes changing a power level of said at least the specific one of the functional units to an operating power level allowing a degraded operation mode.

9. An integrated circuit designed to use functional unit power control instructions inserted by a compiler or post-processing program, comprising:

plural functional units each operable at plural operable power levels, different ones of the plural operable power levels corresponding to different execution speeds of the functional units; and a Vt command decode unit for receiving an instruction stream from an instruction prefetch queue and decoding an addressed functional unit power control instruction inserted by the compiler or the post-processing program, and means for changing a power level for a functional unit to one of the plural operable power levels in response to said addressed functional unit power control instruction.

10. The circuit of claim 9 wherein the means for changing a power level operates to increase the power consumption in response to a power up control instruction.

11. The circuit of claim 6, wherein said means for changing a power level operates to increase the power consumption by reducing a body voltage of at least one transistor in said functional unit.

12. The circuit of claim 9 wherein the means for changing a power level operates to decrease the power consumption in response to a power down control instruction.

13. The circuit of claim 12, further comprising:

a set of timers, each timer for a different one of the functional units;

means to initiate a timer in response to a decoded functional unit power down control instruction addressed to the corresponding functional unit; and power control means responsive to said power down control instruction and expiration of said timer to decrease the power consumption of the functional unit.

14. The circuit of claim 7, wherein said means for changing a power level operates to decrease the power consumption by increasing a body voltage of at least one transistor in said functional unit.

15. The integrated circuit of claim 9, wherein the decode unit is responsive to an instruction stream generated by the compiler or the post-processing program.

16. The integrated circuit of claim 15, wherein the decode unit is responsive to a prefetch queue of the instruction stream generated by the compiler or the post-processing program.

17. The integrated circuit of claim 9, wherein said means for changing a power level changes a body voltage of a transistor in said functional unit.

18. The integrated circuit of claim 9, wherein said means for changing a power level for a functional unit changes the power level to an operating power level which allows a degraded operation mode.

19. For an integrated circuit having plural functional units each operable at plural operating power levels, the integrated circuit including a functional unit power control unit including a Vt command decoder for receiving an instruction stream from an instruction prefetch queue and responsive to power control instructions inserted by a compiler or post-processing program for altering the power status of one or more of said functional units, a method of modifying a sequence of instructions of an application to add power control instructions for controlling the power status of the functional units, said method comprising:
   a) selecting an unprocessed functional unit from a list of functional units,
   b) examining the instructions of the application to identify a segment of instructions which exclusively exercises the selected functional unit, and
   c) upon identifying a segment,
      c=b 1) inserting, via the compiler or the post-processing program, a power up control instruction in a sequence preceding the identified segment addressed to the selected functional unit, and
      c2) inserting, via the compiler or the post-processing program, a power down control instruction in the sequence following the identified segment addressed to the selected functional unit, wherein the power down control instruction controls a power status of the selected functional unit to be one of the plural operating power levels.

20. A method as recited in claim 19 further including the steps of:
   d) upon failing to identify a segment of instructions in response to the examination of step b)
      d1) determining if the selected unit is used in the application,
      d11) if the unit is not used, adding it to a list of "always off" units,
      d12) if the unit is used, adding it to a list of "always on" units,
   e) inserting a power up instruction addressed to each unit on the list of "always on" units at application initialization, and
   f) inserting a power down instruction addressed to each unit on the list of "always on" units at application termination.

21. A method as recited in claim 20 including the further steps of:
   g) inserting a power down instruction addressed to each unit on the list of "always off" units at application initialization.

22. The method of claim 19, wherein one of steps c1) and c2) result in changing a body voltage of at least one transistor in said selected functional unit.

23. The method of claim 19, wherein, in step c1), the power up control instruction includes an instruction to power up the selected functional unit to one of the plural operating power levels corresponding to a degraded mode of operation.

24. A method of operating a programmable integrated circuit having plural functional units each operable at plural operating power levels, the integrated circuit including a functional unit power control unit including a Vt command decoder for receiving an instruction stream from an instruction prefetch queue and responsive to power control instructions for altering the power status of selected one or more of said functional units, said method comprising:
   storing plural instructions, said instructions including power control instructions, at least one of the stored power control instructions including data identifying a specific one of the functional units;
   extracting said stored instructions in a sequence;
   examining each extracted instruction to determine if it is a power control instruction; and
   changing the power status of at least the specific one of the functional units in response to the power control instruction,
   wherein changing the power status includes either decreasing the power consumption of the specific functional unit in response to a power down instruction or increasing the power consumption of the specific functional unit in response to a power up instruction, and
   wherein said decreasing the power consumption of the specific functional unit includes decreasing the power consumption of the specific functional unit to one of the plural operating power levels only after a lapse of at least a predetermined time after responding to the power down instruction.

25. The method of claim 24, wherein said changing the power status includes changing a body voltage of said at least the specific one of the functional units.

26. The method of claim 24, wherein said decreasing the power consumption of said at least the specific one of the functional units decreases the power consumption to one of the plural operating power levels.

27. An integrated circuit designed to use functional unit power control instructions inserted by a compiler or post-processing program, comprising:
   plural functional units each operable at plural operating power levels, different ones of the plural operating power levels corresponding to different execution speeds of the functional units;
   a Vt command decode unit for receiving an instruction stream from an instruction prefetch queue and decoding an addressed functional unit power control instruction;
   means for changing a power level for at least one of the plural functional units in response to said addressed functional unit power control instruction;
   a set of timers, each timer for a different one of the functional units;
   means to initiate a timer in response to a decoded functional unit power down control instruction addressed to the corresponding functional unit; and
   power control means responsive to said power down control instruction and expiration of said timer to decrease the power consumption of said at least one of the plural functional units,
   wherein the means for changing a power level operates to decrease the power consumption of said one of the plural functional units to one of the plural operating power levels in response to a power down control instruction.

28. The integrated circuit of claim 27, wherein the means for changing a power level includes means for changing a body voltage of the functional unit.

29. The integrated circuit of claim 27, wherein the means for changing a power level changes a power level of the functional unit to one of the plural operating power levels and enables operation of the functional unit in a degraded mode.

30. An integrated circuit designed to use functional unit power control instructions inserted by a compiler or post-processing program, comprising:

plural functional units each operable at plural operating power levels, different ones of the plural operating power levels corresponding to different execution speeds of the functional units; and means for changing power levels of said plural functional units including a Vt command decode unit for receiving an instruction stream from a prefetch queue and decoding an addressed functional unit power control instruction, wherein said means for changing power levels of said plural functional units alter a power level for at least one of said plural functional units to one of the plural operating power levels in response to said addressed functional unit power control instruction.

31. The integrated circuit of claim 30, wherein the means for changing a power level includes means for changing a body voltage of the functional unit.

32. The integrated circuit of claim 30, wherein the means for changing a power level changes a power level of the functional unit to one of the plural operating power levels and enables operation of the functional unit in a degraded mode.

* * * * *